US008972336B2

(12) United States Patent
Jagota

(10) Patent No.: US 8,972,336 B2
(45) Date of Patent: Mar. 3, 2015

(54) SYSTEM AND METHOD FOR MAPPING SOURCE COLUMNS TO TARGET COLUMNS

(71) Applicant: salesforce.com, inc., San Francisco, CA (US)

(72) Inventor: Arun Kumar Jagota, Sunnyvale, CA (US)

(73) Assignee: salesforce.com, inc., San Francisco, CA (US)

( * ) Notice: Subject to any disclaimer, the term of this patent is extended or adjusted under 35 U.S.C. 154(b) by 72 days.

(21) Appl. No.: 13/773,286

(22) Filed: Feb. 21, 2013

(65) Prior Publication Data

US 2013/0297661 A1 Nov. 7, 2013

Related U.S. Application Data

(63) Continuation-in-part of application No. 13/773,141, filed on Feb. 21, 2013.

(60) Provisional application No. 61/642,069, filed on May 3, 2012.

(51) Int. Cl.
*G06F 17/30* (2006.01)
*G06F 17/27* (2006.01)
*G06Q 30/02* (2012.01)
*G06N 99/00* (2010.01)

(52) U.S. Cl.
CPC ........ *G06F 17/3007* (2013.01); *G06F 17/2715* (2013.01); *G06F 17/30569* (2013.01); *G06F 17/30985* (2013.01); *G06Q 30/02* (2013.01); *G06N 99/005* (2013.01)
USPC .......................................... 707/602

(58) Field of Classification Search
CPC ..................... G06F 17/2715; G06F 17/30569
USPC .......................................... 707/602
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |

(Continued)

OTHER PUBLICATIONS

Kang et al., Schema Matching Using Interattribute Dependencies, 2008.*

(Continued)

*Primary Examiner* — William Spieler
(74) *Attorney, Agent, or Firm* — Dergosits & Noah LLP; Todd A. Noah

(57) ABSTRACT

A system and method for mapping columns from a source file to a target file. The header for each source column is evaluated heuristically to see if the header matches a predefined entity. The contents of a group of cells in the source column are evaluated probabilistically to determine a probability that the cell contents correspond to at least one of the predefined entities. A score is assigned to the likelihood that the column corresponds to one or more predefined entities. If the score meets a threshold, then the correspondence between the source column and one or more predefined entities is mapped. If the score fails to meets the threshold, then the correspondence between the source column and one or more undefined entities is mapped. Finally, each source column is transformed into a target column in accord with the map.

26 Claims, 11 Drawing Sheets

(56) References Cited

U.S. PATENT DOCUMENTS

| | | | |
|---|---|---|---|
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,718,325 B1 * | 4/2004 | Chandra | 1/1 |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,401,094 B1 | 7/2008 | Kesler | |
| 7,620,655 B2 | 11/2009 | Larsson | |
| 7,664,776 B1 * | 2/2010 | Cameron | 707/803 |
| 7,698,160 B2 | 4/2010 | Beaven et al. | |
| 8,010,663 B2 | 8/2011 | Firminger et al. | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,140,533 B1 * | 3/2012 | Elmeleegy et al. | 707/737 |
| 8,275,836 B2 | 9/2012 | Beaven et al. | |
| 2001/0013035 A1 * | 8/2001 | Cohen | 707/5 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0102303 A1 * | 5/2005 | Russell et al. | 707/101 |
| 2005/0198157 A1 * | 9/2005 | Young et al. | 709/206 |
| 2005/0278139 A1 * | 12/2005 | Glaenzer et al. | 702/179 |
| 2006/0245641 A1 * | 11/2006 | Viola et al. | 382/155 |
| 2007/0219966 A1 * | 9/2007 | Baylis et al. | 707/3 |
| 2009/0005116 A1 * | 1/2009 | Sharma et al. | 455/557 |
| 2009/0063415 A1 | 3/2009 | Chatfield et al. | |
| 2010/0115491 A1 * | 5/2010 | Malron et al. | 717/104 |
| 2010/0318511 A1 * | 12/2010 | Phan et al. | 707/722 |
| 2012/0284259 A1 * | 11/2012 | Jehuda | 707/722 |

OTHER PUBLICATIONS

Warren et al., Multi-column Substring Matching for Database Schema Translation, 2006.*

* cited by examiner posteriors(s) # Returns a heuristic approximation to $P(e|F(s))$

A
if $s$ is *structurally* recognized as an instance of entity $e$
    return $\{e \to 1\}$

B
if $s$ is recognized by dictionary lookup as an instance of entity $e$
    return $\{e \to 1\}$

C
if $n_e(fs, fs(s)) > 0$ for some entity $e$
    return $P(\cdot | \{fs \to fs(s)\})$

D
if $n_e(db, db(s)) > 0$ for some entity $e$
    return $P(\cdot | \{db \to db(s)\})$

E
$F' = \{lw, \text{address\_line\_feature}, w\}$
return $P(\cdot | F'(s))$ end

*FIG. 6*

SYSTEM AND METHOD FOR MAPPING SOURCE COLUMNS TO TARGET COLUMNS

CLAIM OF PRIORITY

This application claims priority from U.S. Provisional Patent Application No. 61/642,069 entitled A System and Method for Mapping Source Columns to Target Columns, by Arun Kumar Jagota, filed May 3, 2012. This application is also a continuation-in-part of commonly owned, co-pending U.S. patent application Ser. No. 13/773,141 entitled System and Method for Using a Statistical Classifier to Score Contact Entities, by Arun Kumar Jagota, filed Feb. 21, 2013, which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the records of the United States Patent and Trademark Office, but otherwise reserves all rights.

TECHNICAL FIELD

The subject matter disclosed herein relates generally to computer-based methods for evaluating character strings, and more particularly, to application of these methods for mapping columns from a source file to a target file.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which may be unique on their own.

In conventional database systems, users access their data resources in a single logical database. A user of such a conventional database system typically retrieves data from and stores data on the database system using the user's own computing systems or devices. For example, a user system might remotely access one of a plurality of server systems that might in turn access the database system. Data retrieval from the system might include the issuance of a query from the user system to the database system. The database system might process the request for information received in the query and send to the user system information relevant to the request. The retrieval of accurate information and subsequent delivery of this information to the user system in a timely and efficient manner has been and continues to be a goal of administrators of database systems.

However, in a multi-tenant database system ("MTS"), various elements of hardware and software of the database system may be shared by one or more customers. The notion of "cloud computing" has recently developed whereby service providers offer access to hardware/software systems through a network, such as the Internet. For example, a specified application server may simultaneously process requests for many customers, and a specified database table may store rows of data for many customers.

In the MTS environment, customers demand up-to-date, comprehensive data. For example, sales and marketing organizations need accurate and up-to-date contact information in order to maintain good relations with existing customers as well as solicit leads for new customers.

Unfortunately, conventional database approaches rely on individuals to maintain their own contact information, and therefore, even within a single organization, individuals may have inconsistent and/or inaccurate contact information.

An advantage of the MTS system is that business enterprises may share data resources, and rely on the MTS provider to maintain accurate data, such as personal and/or business contact information. Another advantage is that all personnel within a single enterprise have access to the exact same contact information, so that inaccuracies or inconsistencies within the organization no longer exist. New or updated information is typically received by the MTS as one or more files or character strings, and it can be difficult to accurately identifying the entity that the character string is associated with. In particular, files with structured data can present challenges in recognizing entities in order to map the data in columns from a source file to the database model.

Accordingly, it is desirable to provide techniques for accurately correlating columns in a source file with defined entities of the database model in order to transform the source file for importation into the data model of the MTS.

BRIEF DESCRIPTION OF THE DRAWINGS

In the following drawings, like reference numbers are used to refer to like elements. Although the following figures depict various examples, the one or more implementations are not limited to the examples depicted in the figures.

FIG. 6 is a software code listing for the process of FIG. 5.

DETAILED DESCRIPTION

1. Simplified System Overview

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query refers to a set of steps used to access information in a database system.

Figure 1:
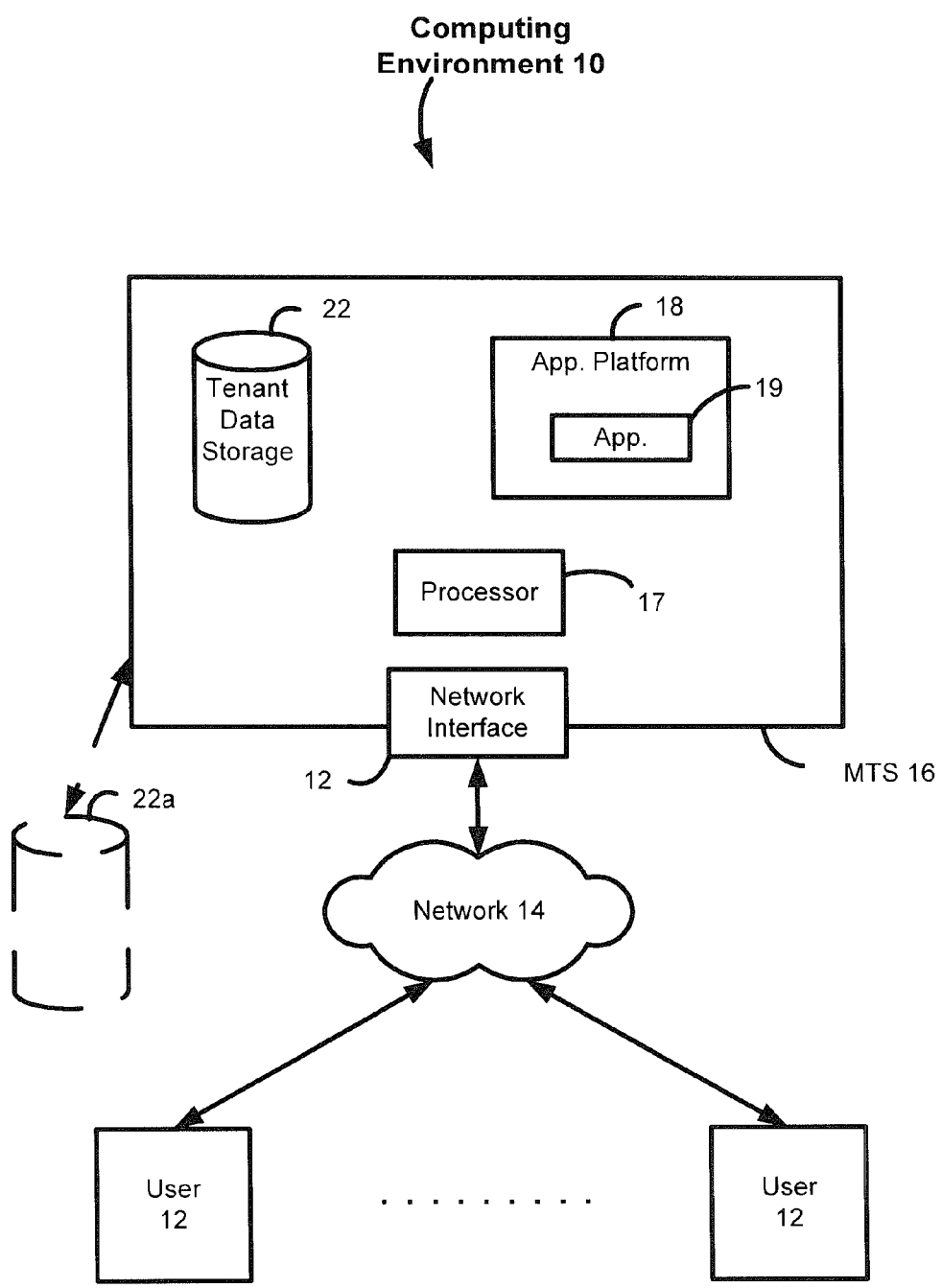
FIG. 1 is a simplified block diagram illustrating a multi-tenant database system ("MTS").
Figure 2A:
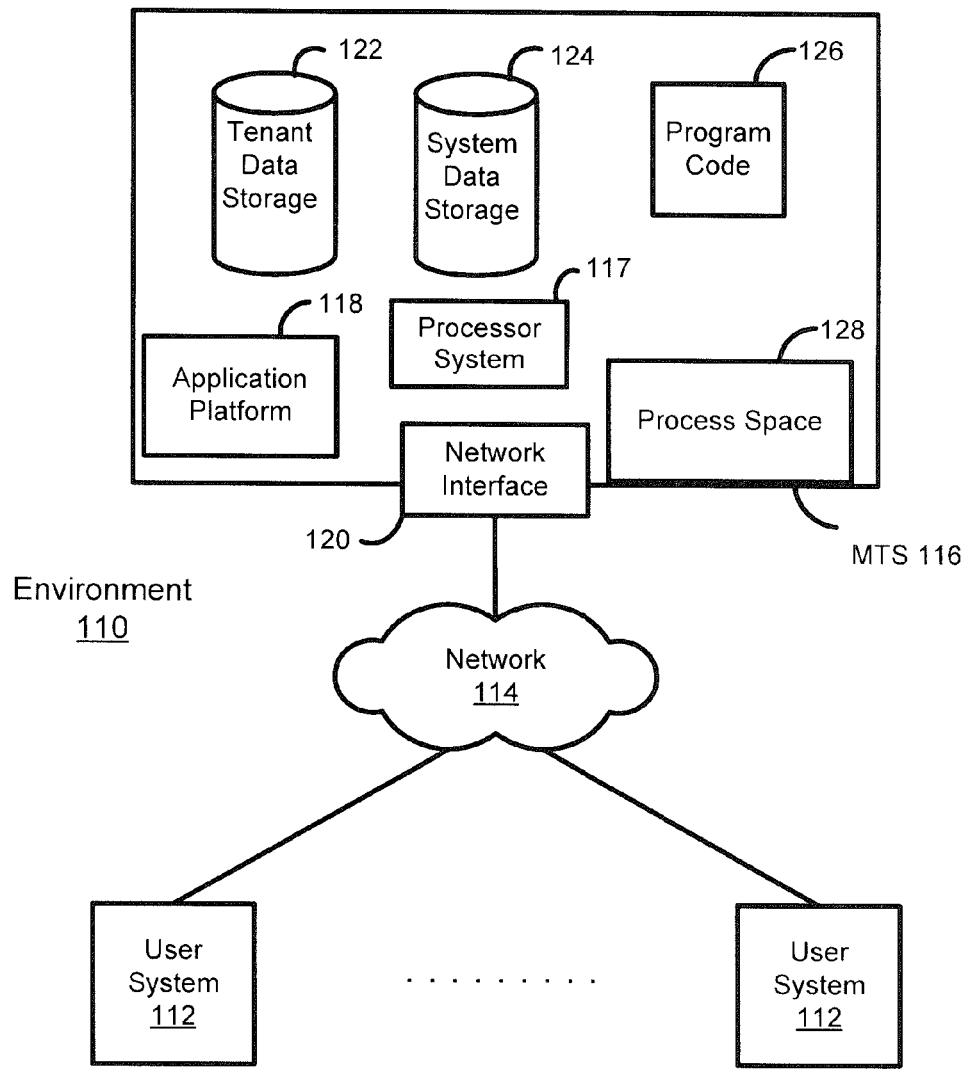
FIG. 2A illustrates a block diagram of an example of an environment wherein an on-demand database service might be used.
Figure 2B:
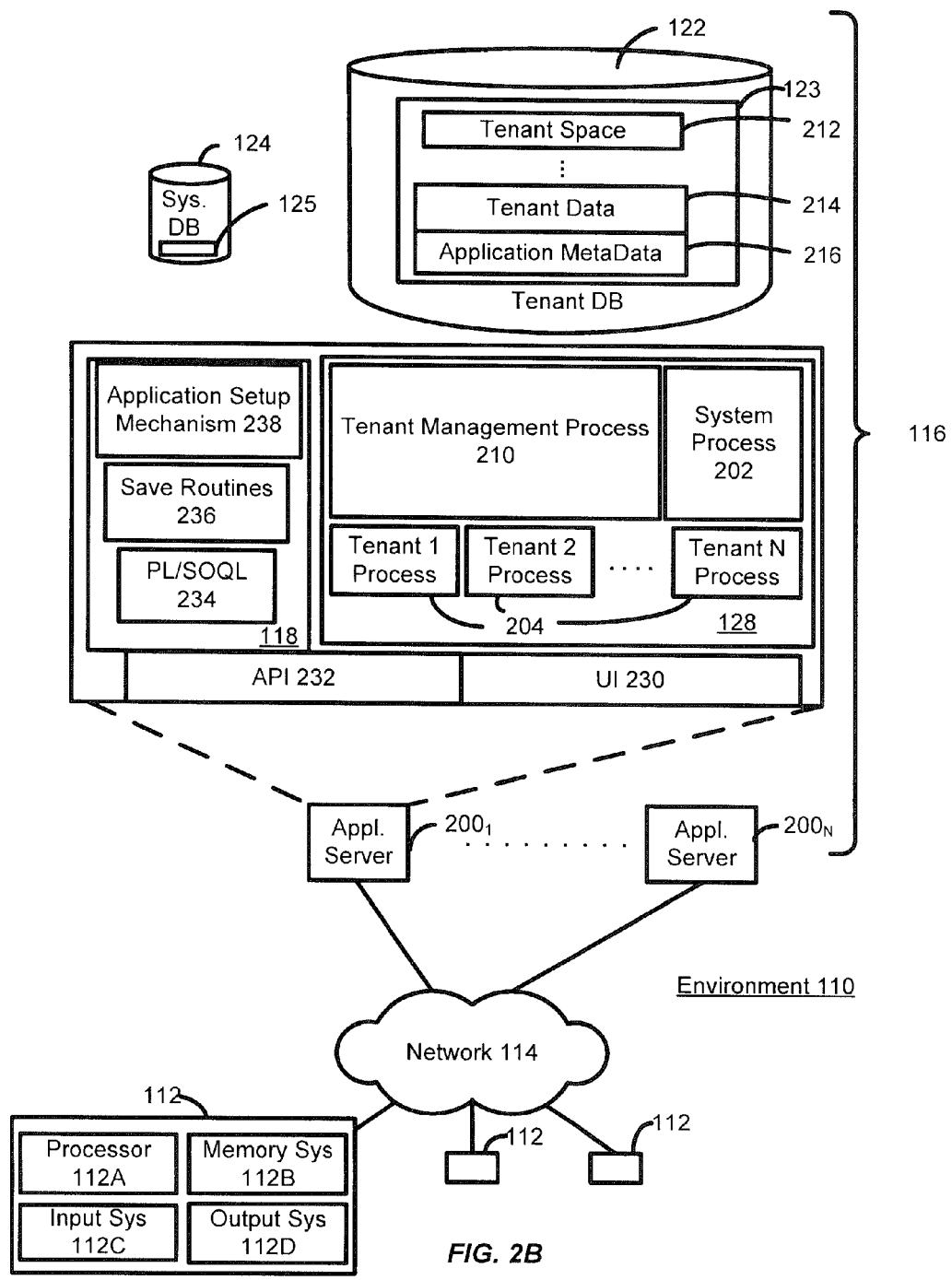
FIG. 2B illustrates a block diagram of an embodiment of elements of FIG. 2A and various possible interconnections between those elements.

FIG. 1 illustrates an embodiment of an on-demand, multi-tenant database service ("MTS") 16 operating in a computing environment 10. User devices or systems 12 access and communicate with the MTS 16 through network 14 in a known manner. More detailed examples for implementing the MTS 16 are shown in FIGS. 2A-2B, described below. For example, user devices 12 may be any computing device, such as a desktop, laptop, table, smartphone, etc. Network 14 may be any type of computing network, such as the Internet, local area network, wide area network, etc. The operation of the MTS 16 is controlled by a processor system 17 running an operating system.

The MTS 16 provides the users of user systems 12 with access to many features and applications available on or through MTS 16. In particular, the MTS 16 includes tenant data storage 22, which is configured through the MTS to maintain tenant data for multiple users/tenants, as further described below and in the patent references mentioned above. Tenant data storage 22 (shown in dashed lines) may be physically incorporated within MTS 16, or may alternatively be remote storage 22a (shown in dashed lines), likewise accessible and useful to the MTS to support user systems 12.

Figure 3:
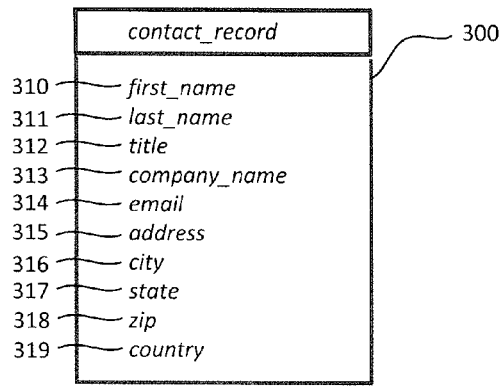
FIG. 3 is a block diagram illustrating a contact record.

Many different types of tenant data may be maintained in tenant data storage 22, including, in particular, contact data, i.e., information about an individual, including name, company, address, telephone number, etc. FIG. 3 illustrates a typical database record 300 for a contact. In this embodiment, the contact record 300 has 10 defined fields or entities: first_name 310, last_name 311, (job) title 312, company_name 313, email 314, address 315, city 316, state 317, zip 318, and country 319. Other fields or other formats may be used.

An important objective for any user of MTS 16 is to maintain up-to-date and detailed information for all contacts. A unique feature of MTS 16 described herein is one or more applications 19, managed and operated by the MTS through its application platform 18, that facilitate this objective by providing one or more sets of program instructions providing features to help maintain and secure the accuracy and reliability of the tenant data, whether it is contact data, company data, etc. For example, instructions may be provided for crawling the Internet or any other available network or document repository to find relevant information; for extracting a string of characters; and for making a probabilistic determination as to which entity the string belongs. Alternatively, instructions may be provided for receiving, normalizing and importing data files to fit the data model of the MTS.

Figure 4:
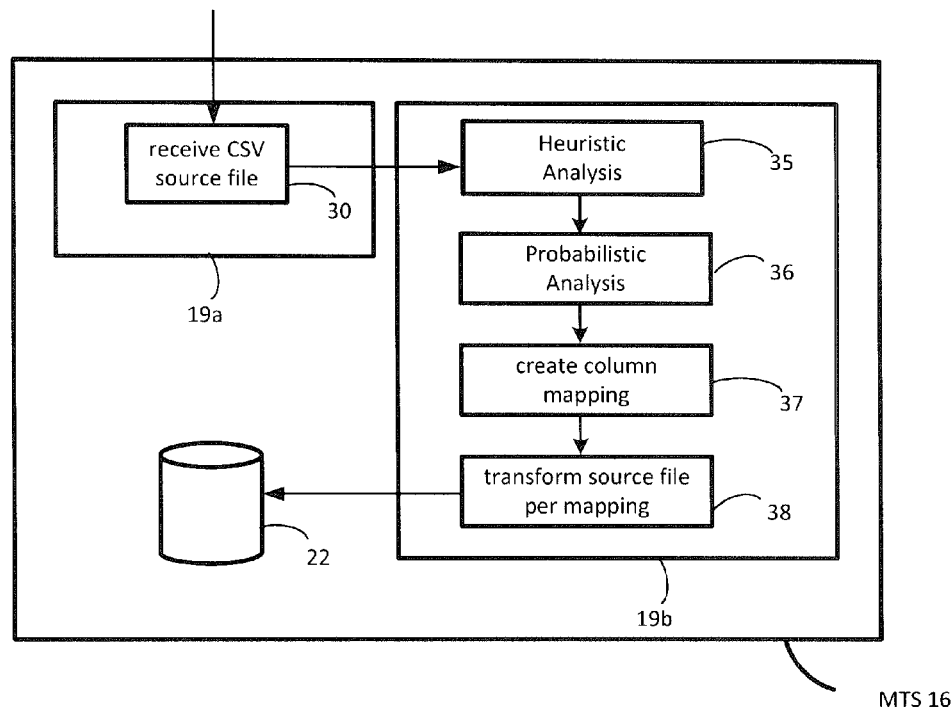
FIG. 4 is a block diagram illustrating the operational flow of handling a character string through the MTS.

The block diagram shown in FIG. 4 illustrates the operation of applications 19a and 19b. Application 19a handles simple receipt and pre-processing of a source file having data in CSV format or similar. Application 19b handles processing including heuristic and probabilistic analysis of the CSV file, mapping the source file to the data model, then transforming the CSV file in accord with the mapping.

In application 19a, a first program module 30 has program code suitable to receive and place into temporary storage data files from an external source, the files having data arranged in row and columns. For example, a user may upload one or more CSV files having contact records or company records. The creation of program code suitable to retrieve and store CSV file or the like in module 30 is routine for those skilled in these arts and need not be described in further detail herein.

In application 19b, the source file is first subjected to a heuristic analysis by program module 35 to evaluate whether column headers of the source file are recognized structurally as defined entities of the data model. The contents of the columns are then subjected to a probabilistic analysis by program module 36 to evaluate whether the contents help correlate the columns to defined entities of the data model. The results of the heuristic analysis and the probabilistic analysis lead to the creation through program module 37 of a plausible mapping scheme of the columns of the source file to the entities of the data model. Finally, the columns of the source file are transformed in accord with the mapping scheme and stored in tenant storage of the MTS.

2. Entity Recognition in Character Strings

A probabilistic scoring method incorporates a Bayes classifier to compute a posterior probability distribution over various defined entities of a contact record for any given input. The Bayes classifier algorithm is well known. See, for example, T. Mitchell, *Machine Learning* (McGraw-Hill 1997). As an example, consider the string "Cisco." The probability that the string is one of the defined entities of the contact record can be written as P(first_name|"Cisco"), P(last_name|"Cisco"), P(title|"Cisco"), etc. These probabilities quantify the likelihood that the character string "Cisco" is a first name vs. a last name vs. a job title, etc. Accordingly, the posterior probabilities can be written as P(e|s), where e denotes the entity and s denotes the input string. However, the method described herein uses advanced features of the Bayes method, described below, to help recognize the defined entities as accurately as possible. Thus, the posterior probabilities are not computed directly from string s, but instead from a certain set of features extracted from string s.

Let f denote a certain feature of the Bayes classifier, and therefore f(s) is its value in s. Then let $F(s)=\{f \rightarrow f(s)\}$ denote the set of (feature-name, feature-value) pairs in string s. Therefore, P(e|F(s)) is a succinct and precise way of saying that the posterior probably that the character string is entity e is computed from the features extracted from s. However, rather than using only the strict probabilistic formulation, an heuristic, iterative method is described which looks at the character string s and decides which features to use for that particular character string s, thereby providing a reasonable approximation of the posterior probability.

A. Features for String Recognition

There are many applications that have a need to recognize the entity of a given character string s. For example, the string "Los Angeles" should be recognized as a city, the string "94512" is probably a zip, and the string "John" is probably a first name. These type of determinations can be made by finding the entity which has the highest approximate posterior probability for the given string s. This entity is then guessed to be the correct entity, and its posterior probability is the confidence in that prediction. Further, if the confidence is not high enough, then the guess may be abandoned and no prediction made.

Other applications may use the posterior probabilities in a more elaborate scoring scheme. For instance, when checking spreadsheets for fraudulent or bad data, each value in a column is scored against the entity the column represents. For example, if the column has a header that indicates that the column stores "job titles," and one of the values in this column is "XYZ Inc," then this value should get a low score because it is clearly a company name, not a title. This score can simply be the approximate posterior probability of the column's entity given that value. The posterior probabilities of the column's entity are calculated one by one for all values in the column. The overall score can then be defined to be the average of these posterior probabilities. The score then quantifies how well the data in the column fits the column's entity.

The Bayes classifier can be used to define an advanced set of features which help discriminate among entities. The relatively harder cases are distinguishing person names from titles; distinguishing titles from company names; distinguishing person names, titles, and company names from address lines; and distinguishing phone numbers from zip codes.

The advanced features are described below. All of the features change the string to lower-case and remove any flanking white space from it.

The last word feature, denoted as lw(s), returns the last word in the input string.

The digit-blurring feature, denoted as db(s), replaces every numerical digit in the input string by the character 'd.'

The words feature, denoted as w(s), returns a set of one or more words in the string, i.e. substrings, separated by white space. The last word is excluded from this feature because it is already in the feature lw(s).

The full string feature, denoted as fs(s), returns a version of the original string s in lower case characters with flanking white space removed.

The address line feature is a fairly elaborate feature. This feature is used to accurately discriminate between strings that form address lines and strings that form other entities, such as title, company name, city, first name, etc. For example, let $s_1$ $s_2 \ldots s_k$ denote the token sequence of the string s obtained by splitting the string on white space. The feature is the string f(s) formed by concatenating $f_1, f_2, \ldots, f_k$, joined by a single blank, where each $f_i$ is a string, and $f_i$ equals "d" if $s_i$ is all digits; $f_i$ equals "w" if $s_i$ is all non-digits; $f_i$ equals "wd" if $s_i$ is a mix of digits and non-digits; $f_i$ equals $n(s_i)$ if $s_i$ is a normalizable word; else $f_i$ equals "ws".

The term $n(s_i)$ needs additional explanation. The desired normalizations may be represented as a map n: string→string, i.e. a map of (key, value) pairs. If $s_i$ (after changing to lower-case and stripping away flanking white spaces) is a key in this map, then $f_i$ is set to $n(s_i)$. The example below shows a few (key, value) pairs that are put into the map n.

avenue→road, road→road, boulevard→road, blvd→road

These key/value pairs are chosen since they help discriminate strings in address lines from strings in other entities. Normalizing different ways of saying the same thing, e.g. all of these terms can be treated as "road," leads to a more compact model, and compact models tend to generalize better. One way to think about this normalization is the following: take any address line having the word "avenue" (or "boulevard" etc.) in it, and replace the word "avenue" with the word "road." This action does not change the prediction that that string is an address line (and not a title, or a company name, etc.).

B. Last Word Feature

The last word feature is a strong predictor that the string s is a company name. A few examples are presented in Table I below.

TABLE I

| String | Feature value |
|---|---|
| "XYZ Corp" | "corp" |
| "Johnson Computers" | "computers" |
| "VP of Sales" | "sales" |

For example, the string "XYZ Corp" will get predicted as a company name because it ends with the word "corp" as detected by the last word feature. This will happen even if "XYZ Corp" is not in the training set. Thus, the last word feature helps the algorithm to generalize, i.e., to be able to detect companies as company names even when not in the training set.

The effect of this feature could be partly emulated by maintaining a dictionary of common company name suffixes, such as inc, corp, etc., and applying a rule "If the last word in the string is one of these suffixes, then predict that the string is a company name." However, the statistical classifier employing the last word feature works much better, provided that a large and representative training set of the various entities is available.

The statistical classifier is more effective works better than a dictionary look-up because the statistical classifier automatically extracts words from the training set that, when occurring as last words in strings, are strong predictors that the string is a company or organization name. Beyond the common company suffixes that would get picked up automatically, these include words such as systems, trust, board, computers, agency, etc. Reconstructing these "soft" company name suffixes manually would be a daunting task.

No less importantly, even if such a set could be assembled somehow, the rule makes a hard decision just based on this feature, and such a decision would be too risky in many cases. The statistical classifier, by contrast, uses the predictions and their strengths made by this feature in conjunction with those from other features and is thus more accurate. To illustrate, consider the string "XYZ Systems." The statistical classifier would conclude that this is highly likely to be a company name because it ends with "Systems" and "XYZ" does not predict some other entity. (Some other features could come into play as well, if warranted.) Consider a different string VP of Information Systems. Although Systems predicts company name strongly, it predicts title at least weakly under the (reasonable) assumption that titles ending with the word Systems are also in the training set of titles. Furthermore other features extracted from the string (e.g. VP) predict title much more strongly than company name. So one would expect the aggregate of the evidence from the various features to favor title, as it should.

C. Digit-Blurring Feature

The digit-blurring feature is a strong predictor that the string is a phone or a zip, and which of the two. The numerical specific digits of the string are blurred out, but the position of the digits is retained, as well as the identity of the other characters. Some examples are presented in Table II below.

TABLE II

| String | Feature value |
|---|---|
| "346 4928" | "ddd dddd" |
| "+1 (592) 346 4928" | "+d (ddd) ddd dddd" |
| "95128" | "ddddd" |
| "95128-4209" | "ddddd-dddd" |
| "John Van" | "john van" |
| "SW1A 0AA" | "swda daa" |
| "+61 418 123456" | "+dd ddd dddddd" |

Blurring out the specific digits allows generalization, i.e., recognition of strings that are phones or zips, but that are not in the training set as such. Replacing each of the numerical digits with the letter 'd' and keeping the rest of the non-numerical characters intact retains just the information to distinguish phones from zips and other entities. For example, dddd–dddd is more likely to be a zip than a phone, and "+dd ddd dddddd" is more likely to be a phone than a zip.

This feature allows a system to 'learn' many different formats of phones and zips without having to explicitly model each one of them. All it requires is that the training set be rich enough. For example, to recognize phone numbers from different countries, the training set should have examples of phone numbers from different countries. Also, phone numbers from the same country with different formats could be included simply by including examples of each format in the training set. Thus, a training set could have U.S. phone numbers with the long-distance prefix "+1" missing, or with the "+" missing, that use parentheses, hyphens, or periods, etc. Similarly, the training set could have 5-digit U.S. zip codes and the more comprehensive format of (5+4)-digit U.S. zip codes.

D. Words Feature

This discussion applies to the combination of the words features and the last word feature (described above). Several examples are shown in Table III below.

TABLE III

| String | Values of features |
|---|---|
| "Vice President of Sales" | {"vice", "president", "of"} |
| "John Van" | {"john"} |
| "123 Market St" | {"123", "market"} |
| "346 4928" | {"346"} |
| "New York" | {"new"} |
| "john" | { } |

These two features work well to discriminate titles from other entities. This is because certain words, such as 'president,' 'vice,' 'officer,' 'chief,' and many others, almost always occur in titles, but not in other entities. These two features also help with generalization in multi-word first and last names. As an example, if "John Van" is labeled as a first name in the training set, these features predict that "John" and "Van" are also plausible first names.

E. Full String Feature

This discussion applies to the combination of the words features and the last word feature (described above). Several examples are shown in Table IV below.

TABLE IV

| String | Feature value |
|---|---|
| "Los Angeles" | "los angeles" |
| "California" | "california" |
| "123 Market St" | {"123", "market"} |
| "346 4928" | {"346"} |
| "New York" | {"new"} |
| "john" | { } |

The full string feature is useful for recognition of entities whose values tend to be from a controlled vocabulary, namely city and state. Consider the string "California." The method should predict that the entity is state with 100% confidence. Now consider the string "California Security Systems." The method should now predict that the entity is company name instead. The full string feature ensures that the former happens, while the words feature makes the latter happen.

F. Address Line Feature

The address line feature is a strong predictor that the string is an address line. Several examples are shown in Table IV below.

TABLE V

| String | Feature value |
|---|---|
| "1 Market St" | "d w road" |
| "One Broadway Blvd" | "d w road" |
| "Intel" | "w" |
| "L5 Inc" | "wd w" |

TABLE V-continued

| String | Feature value |
|---|---|
| "New York" | "w w" |
| "408 345-1234" | "d ws" |
| "Vice President of Sales" | "w w w w" |

G. Training Set

The aim of training is to learn, from a training set, the correlations between the values of the various features and the defined entities. Table VI below is a small sample training set. (note—an actual training set to produce an accurate classifier would have a lot more examples, perhaps several million.).

TABLE VI

| String | Correct entity |
|---|---|
| "Vice President of Sales" | title |
| "XYZ Inc" | Company name |
| "123 Market St" | Address line |
| "+1 921 346 4928" | phone |
| "95316" | zip |
| "New York" | state |
| "New York" | city |
| "New York" | state |
| "Australia" | Country |
| "Los Angeles" | state |
| "New York City" | City |
| "John" | First name |
| "Smith" | Last name |
| "Cleveland" | city |
| "Cleveland" | Last name |

Note that the same example(s) can appear multiple times in the training set. This can be useful—the classifier uses frequency (among several other factors) to strengthen the learned correlations between the values of various features and the entities. Also note that the training set can contain the same string mapped to different entities. For example, the string "Cleveland" is a city but it can also be a last name. In a rich training set, one would expect ("Cleveland", city) to occur much more frequently than ("Cleveland", last name). This and the fact that there is much more diversity in last names than cities allows the classifier to automatically learn that "Cleveland" is a city or a last name, with the former being more likely in the absence of other information.

H. Training Process

Let (s, e) denote an example in the training set, where s is the string and e its correct entity. In this notation, e is called the label of s. First, the set of all features F(s) are extracted from s. Then, each of two counters is incremented by one (both counters are initialized to 0 at the beginning of the training). $n_e$, is the number of examples in the training set labeled e. $n_e(f, f(s))$, is the number of examples in the training set labeled e whose feature f has value f(s).

From these counts, we get $$P(f(s) \mid e) = \frac{n_e(f, f(s))}{n_e},$$

which is used for computing the posterior probabilities, as further described below. An example of a string and the various features extracted from it is shown in Table VII below.

TABLE VII

| String | "123 market St" |
|---|---|
| Last word feature | "st" |
| Word features | {"123", "market"} |
| Full string feature | "123 market St" |
| Address line feature | "d w road" |

3. Heuristic Approximation of Posterior Probabilities

Figure 5A:
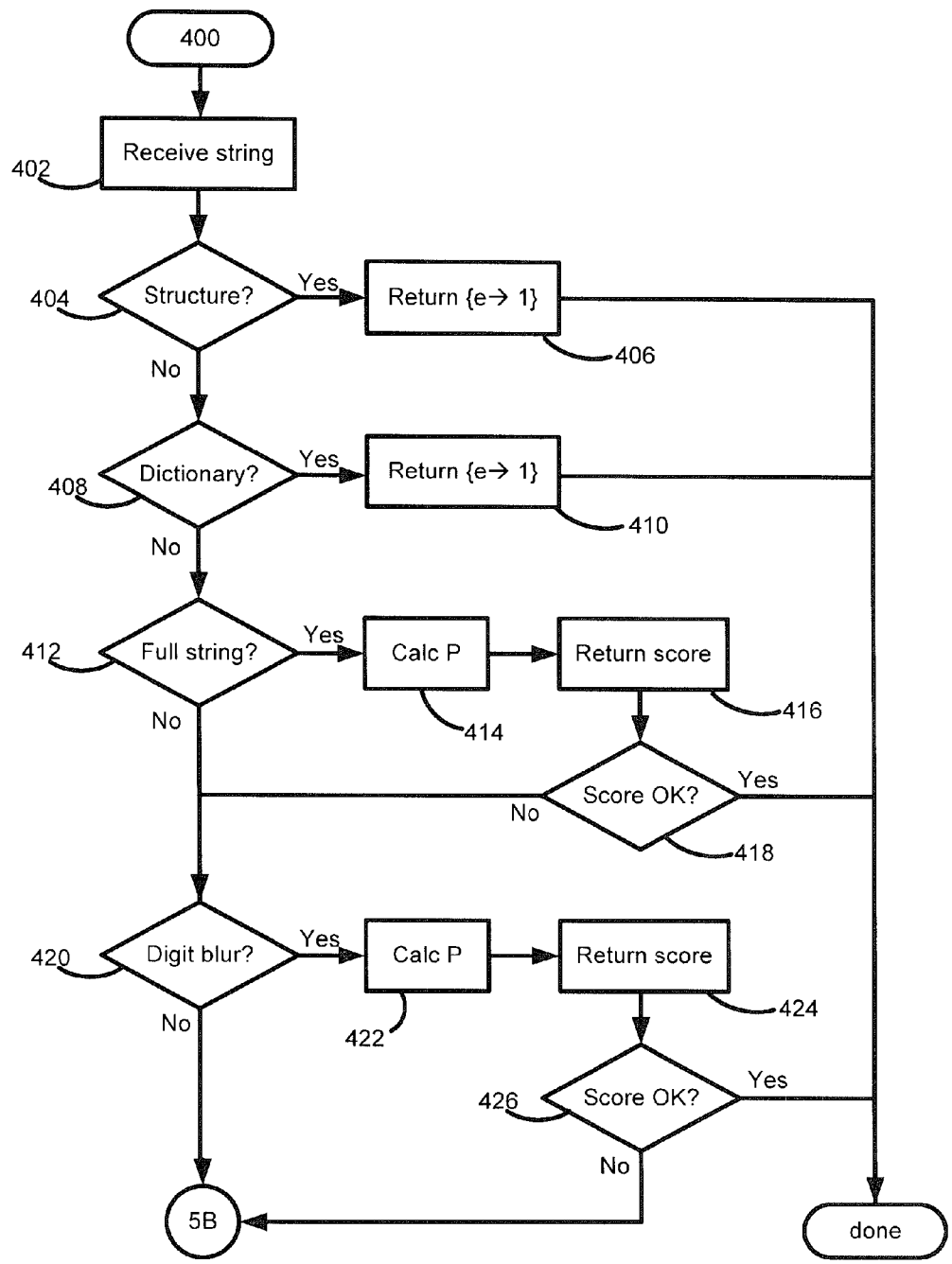
FIGS. 5A & 5B are flow charts illustrating a process for applying a statistical classifier to the problem of identifying an entity associated with a character string.
Figure 5B:
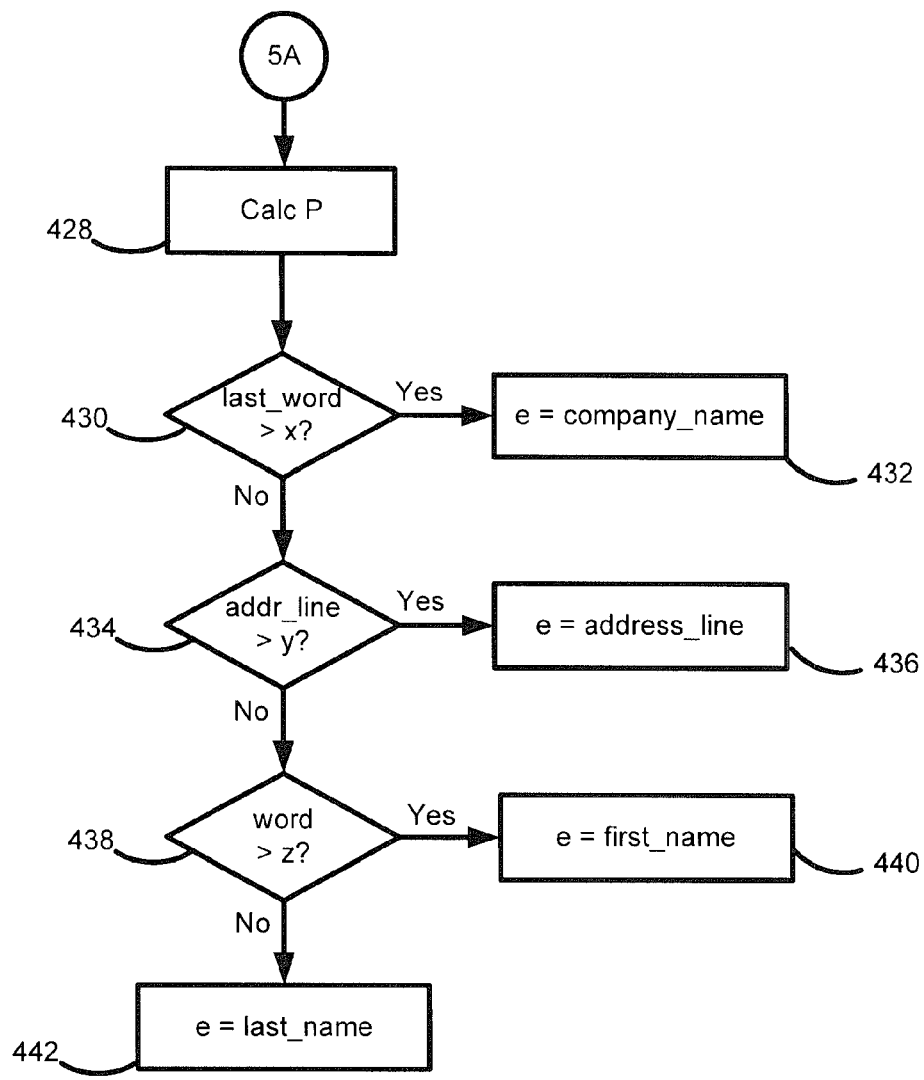

FIGS. 5A and 5B illustrate a process 400 that provides a heuristic approximation of the posterior probabilities that a character string s is one or more of the defined entities. The process 400 is preferably provided as an integrated web service, for example, as application 19 of MTS 16 in FIG. 4, but could be provided in other forms as well.

In step 402, an input character string is received. In step 404, the string is evaluated to see if it is recognized structurally as a particular instance of entity e. If so, then in step 406, a score of 1 is returned for entity e, i.e., the probability is 100% that the string is actually entity e. The structural recognition step is done first because it is only successful where there is a near certainty that the structure of the string is correctly identified as representing the entity e. There must be no ambiguity, i.e., the structure must be well-defined. For example, an email address typically has the format <name@domain>. Structural rules may be developed from the training set.

If the string is not structurally recognized in step 404, then the string is evaluated in step 408 for dictionary-based recognition. If so, then in step 410, a score of 1 is returned for entity e, i.e., again, the probability is 100% that the string is actually entity e. As with structural recognition, there must be a near certainty that the structure of the string is correctly identified as representing the entity e. Dictionary-based rules may also be developed from the training set.

If dictionary-based recognition does not occur in step 408, then the string is evaluated in step 412 for a "softer" version of dictionary-based recognition. More specifically, the full string feature is applied to the string, and if there is at least one example of that string in the training set, i.e., if $n_e(fs, fs(s))>0$, then in step 414, the posterior probabilities are calculated for each of the defined entities over the full string feature, i.e., $P(\cdot|\{fs \rightarrow fs(s)\})$, and the score is returned in step 416. If the score for any entity is high enough in step 418, then characterizing the string as that entity may be accepted. If the score is not high enough, then characterizing the string as that entity may be rejected, and the process continues.

Take s=cleveland as an example. $n_e(fs, fs(cleveland))$ is greater than 0 for e being {city, last_name, . . . }. Therefore, the posteriors of various entities are computed over this feature value. This should inform us that cleveland has a high probability of being a city, and a lower (but greater than zero) probability of being a person's last name.

If there is not at least one example of the string in the training set in step 412, or if the string characterization is rejected in step 418, then the digits blurring feature will be evaluated. More specifically, the digit blurring feature is applied to the string in step 420, and if there is at least one example of that string in the training set, i.e., $n_e(db, db(s))>0$, then in step 422, the posterior probabilities are calculated for each of the defined entities over the digit blurring feature, i.e., $P(\cdot|\{db \rightarrow db(s)\})$, and the score is returned in step 424. If the score for any entity is high enough in step 426, then characterizing the string as that entity may be accepted. If the score is not high enough, then characterizing the string as that entity may be rejected, and the process continues.

The digit blurring step accurately scores phone versus zip. For example, the string "ddddd-dddd" will be scored high for being a zip and much lower for being a phone; v the string "dddddddd" will be scored roughly the same for being a zip or a phone; and "+1 ddd ddd-dddd" will be scored very high for being a phone and zero or near-zero for being a zip.

If there is not at least one example of the string in the training set in step 420, or if the string characterization is rejected in step 426, then the string is probably an address line, a company name, or an unknown first name or last name of a person. Step 428 calculates posterior probability for each of the three remaining features (address_line, company_name, last_word) over all entities. The score is then used to discriminate between these entities.

Generally, for any subset F'(s) of F(s), $P(\cdot|F'(s))$ denotes the distribution of posterior probabilities restricted to the features in F'(s). $P(\cdot|F'(s))$ is computed in the usual way, by applying the Bayes rule under the assumption of conditional independence of the features in F'(s) given the entity. That is:

$$N(e) = P(e) \prod_{\substack{f \text{ is a} \\ \text{feature} \\ \text{in } F'(S)}} P(f(s)|e)$$

$$P(e|F'(s)) = \frac{N(e)}{\sum_{e'} N(e')}$$

Because certain values of lw strongly predict that the entity is company name, in step 430, if the score of lw is greater than x, than the entity is accepted as company name in step 432. Because certain values of address_line strongly predict that the entity is address_line, in step 434, if the score of address_line is greater than y, than the entity is accepted as address_line in step 436. Because certain values of w strongly predict that the entity is first_name, in step 438, if the score of w is greater than z, than the entity is accepted as first_name in step 440. If none of the above, then the entity is first_name in step 442. Process 400 may be coded as shown in FIG. 6.

4. Application to Column Mapping

A. Normalization of Column Names

A database may be used to maintain many different types of structured data other than just contact data, including company data, financial data, product data, health data, manufacturing data, etc. Structured data is often stored in a format suitable for spreadsheet analysis, such as comma-separated values ("CSV"), tab-delimited or tab-separated values ("TSV"), or an Excel file, for convenience of creation, analysis, and distribution. However, before importing such source data into the database, it needs to be normalized, i.e., the columns in the source data need to be properly mapped to the attributes of the target data model for the database. More specifically, this means that a sequence of target columns in the database represent predefined entities of the data model. For example, the primary attributes of interest, or predefined entities, of a contact record in one embodiment of the database are: first_name, last_name, job_title, email address, phone_number, company_name, street, city, state, zip, and country. In this embodiment, a contact record is considered complete if at least the first four columns, namely first_name, last_name, job_title and email, are non-empty.

Structured data frequently has issues that cause difficulty in mapping data from source columns to target columns. For example, the header or column names for the source data may be non-standard, e.g., "First" used for first_name, or "Last" for last_name, etc., and such names must be correlated to the appropriate target entities if possible. Some columns in the source data may be irrelevant and need to be ignored, such as "Hobbies" or "Alternate Fax." Other columns may have data that needs to be merged or split. An example of the former is a pair of source columns named "street1" and "street2," which need to be mapped into a single target column street. An example of the latter is a source column "name" which contains the full name of a person, and which needs to be split to be mapped into the pair of predefined target columns first_name and last_name.

In a significant number of files, even the header row is missing for the source data. In such cases, the only way to accurately identify the columns of interest and infer their correct names is to analyze the content of the file. For example, if a column seems to contain first names, it is probably the target entity first_name, especially if other evidence corroborates it, e.g., it is immediately to the left of the last_name column.

Content-based analysis can be useful even when the file has a header row. For example, sometimes the name of a source column is ambiguous, e.g., title could mean job title or salutation. Another example is that the source column name is not recognized as a known alias for one of the target entities. In these examples, evaluation of the content of the source column provides additional information that can help make a decision as to what entity the source column represents.

The evaluation of content in a source column uses the statistical classifier described previously to score the value of each cell against each possible entity name for a selected number of rows in the source file. The scores returned on the individual calls to the classifier for each cell are then used by a more elaborate probabilistic scoring engine to make the final guess as to column name.

B. Method for Mapping Columns

Figure 7:
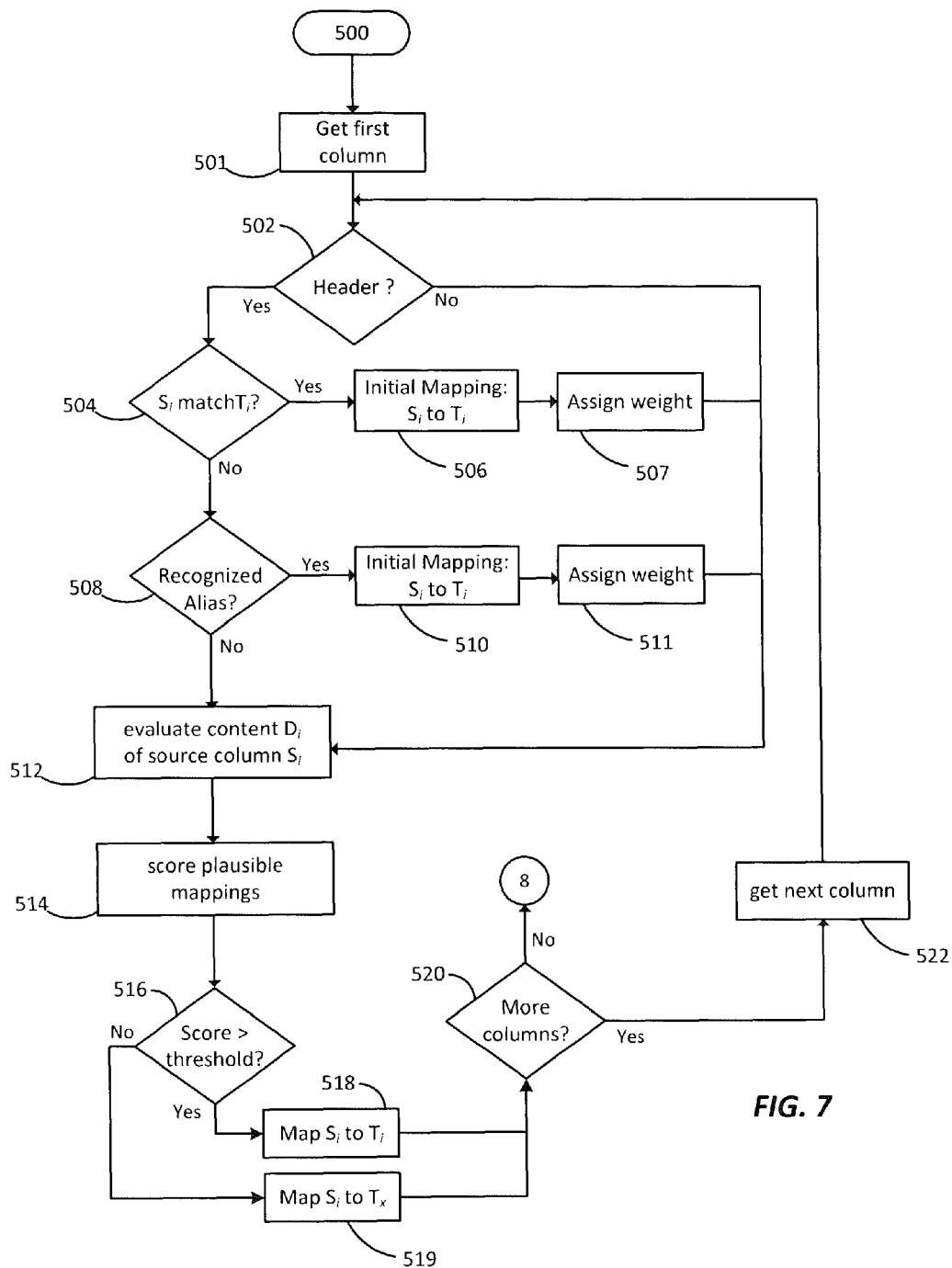
FIG. 7 is a flow chart illustrating a process for mapping source columns to target columns.

Referring now to FIG. 7, a process 500 is illustrated for mapping columns in a source file to columns in a target file. The source data is modeled generally as (S, D) where $S_i$ is the name of the $i^{th}$ source column and $D_i$ is the data in this column. The objective is to find the most likely sequence of target column names T for this source data (S, D), where $T_i$ is the target column for the mapping of source column $S_i$, and to apply the mapping to transform the data.

In step 501, the first column of the source file is retrieved into temporary storage. In step 502, the top of the column is evaluated—does it have a header, i.e., a column name? If so, then in step 504, the header of the source column is compared with the names of the target columns/entities to see if there is an exact match. If so, then in step 506, the name of the source column is initially identified as being mapped to the matching target column, and in step 507, this mapping is weighted heavily, i.e., a high score, since the match is exact.

If there is no actual match in step 504, then the name of the source column is compared to a table of known aliases of the actual names in step 508. If the alias is recognized, then the name of the source column is initially identified as being mapped to the target column matching the alias in step 510. In step 511, this mapping is weighted moderately, i.e., a medium score, not as high as an exact match but higher than no match.

If the name of the source column is not recognized as an alias in step 508, or the source column does not have a header at all in step 502, then the content of the source column is evaluated in step 512. Further, even if there is a match and initial mapping, content analysis is still useful to corroborate and support the initial mapping to provide a higher (or lower) confidence score. As explained in more detail below, evaluating the content in step 512 involves looking at each cell in a column for a number of rows, for example, twenty rows, and evaluating the likelihood that the content of the cell corresponds to one or more of the defined target entities. Ultimately, a score may be derived representing the likelihood for each defined entity in step 514. These entity likelihood scores may be influenced by the weight assigned to an initial mapping in either step 507 or 511.

If the score for a specific mapping of the source column S, to a defined target entity $T_i$ exceeds a defined threshold in step 516, for example, 80%, then the mapping is created or updated to reflect that correspondence in step 518. If the score is not adequate in step 516, then the mapping is updated in step 519 to associate the source column $S_i$ with a previously undefined target column $T_x$, for example, adopting the name of the source column. Such a result likely means that the source column is irrelevant and therefore will be ignored in a post-processing step when the data is actually converted.

Figure 8:
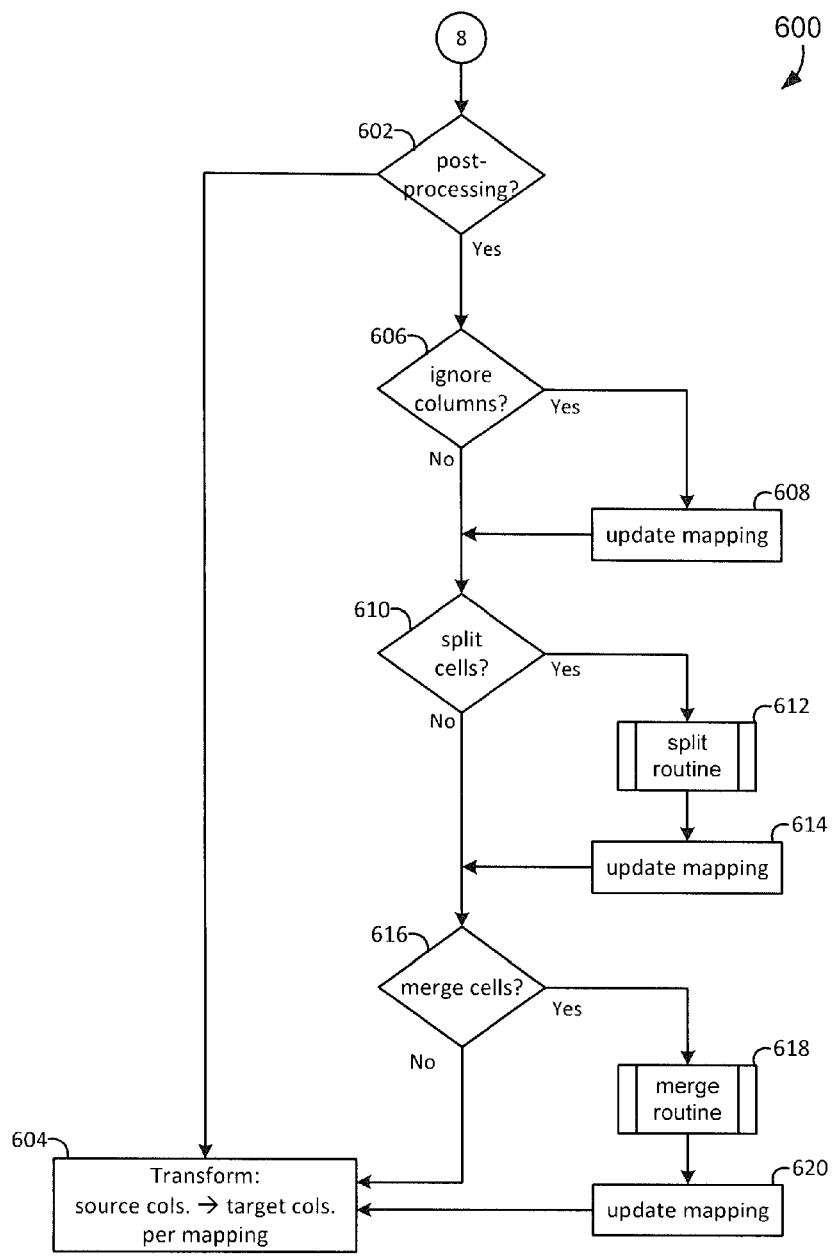
FIG. 8 is a flow chart illustrating post-processing steps for the process of FIG. 7.

If all the source columns have not yet been evaluated in step 520, then the system gets the next column in step 522 and returns to step 502 to evaluate the next column. If all the source columns have been handled in step 520, then post-processing and conversion of the columns is accord with the mapping will proceed as in process 600, as will now be described in connection with FIG. 8.

The question of whether any post-processing steps are required is considered in step 602. For example, if one or more source columns need to be ignored, merged or split, then post-processing is required. If post-processing is not required, then in step 604, the source columns are transformed in accord with the mapping scheme and stored in the database. Note this might be an unusual result since one would expect to find some differences between the source file and the target data model.

If post-processing is required in step 602, then in step 606, the system will check to see if any source columns should be ignored at the actual data transformation stage. Source columns to be ignored will have been mapped to a target column not previously defined in the analysis stage, and after considering (through content analysis) and rejecting that such columns might contain relevant content to be split or merged, an indicator is set, such as a program flag, to tell the process this column should be ignored. In step 608, the mapping is updated to include an instruction to specifically exclude or remove all columns marked "ignore" when transformation of the data occurs.

In step 610, the system checks for any columns that need to be split. Recall the prior example of a source column containing a full name, and thus needing to be split into the defined entities first_name and last_name for proper transformation. Columns requiring a split will be recognized as such during content analysis, and will be identified for special handling. For example, a split routine may be performed in step 612 to split the source column into its constituent parts, which may then be mapped to the corresponding defined entities in step 614.

In step 616, the system checks for any columns that need to be merged. Recall the prior example of a pairs of source columns called street1 and street2, thus needing to be merged into the single defined entity address. Columns requiring merger will also be recognized as such during content analysis, and will be identified for special handling. For example, a merge routine may be performed in step 618 to merge a pair of source columns into a single column, which may then be mapped to the corresponding defined entity in step 620.

Once all post-processing steps have been considered, then the source columns are transformed in accord with the updated mapping scheme and stored in the database.

Figure 9:
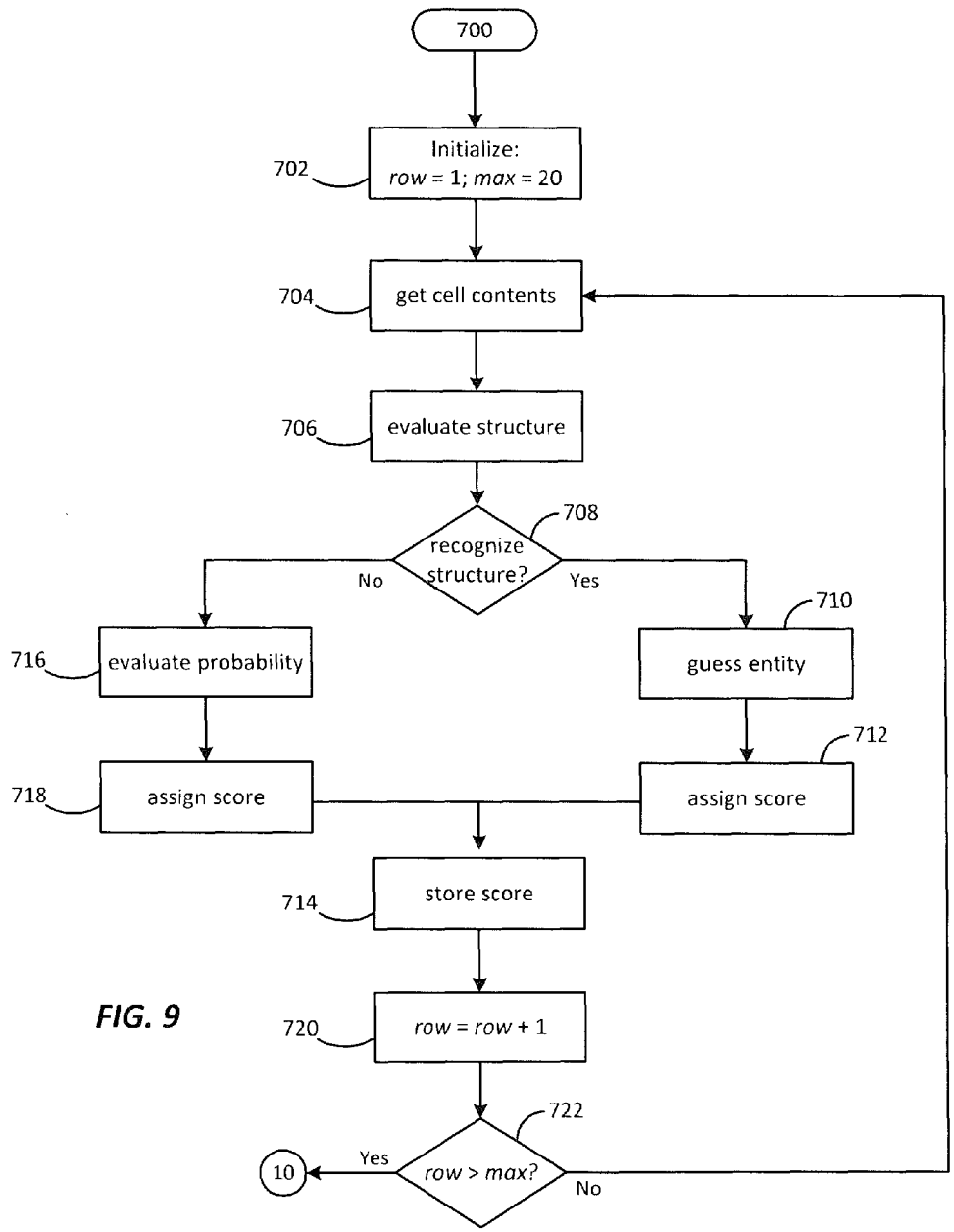
FIG. 9 is a flow chart illustrating the step of evaluating contact from the process of FIG. 7.

The evaluation of content of a source column in step 512 is further illustrated in FIG. 9. In step 702, initialization for this column takes place, setting a counter row=1 and setting the maximum count for a representative sample size of rows, for example, max=20. In step 704, the content of the cell is received into temporary storage for processing. The structure of the cell content, e.g. a character string, is evaluated in step 706, as described previously. If the structure is recognized in step 708, e.g., it matches the structure of a defined entity with a near certainty, or it matches a known alias for a defined entity stored in a lookup table, then in step 710, the column is associated with the defined entity as an educated guess. Further, as noted above, a relatively high confidence score is assigned to this guess in step 712 since it is associated with a structural match. The score for this cell is stored in step 714.

If the structure of the cell contents is not recognized in step 708, then the cell contents, i.e., the character string, is evaluated in step 716 using a probabilistic approximation. As described above, the probabilistic approximation uses advanced string features of a statistical classifier in an ordered approach to try and recognize the string as one of the defined entities. This probabilistic approach results in a confidence score in step 718, and the score for this cell is stored in step 714.

In step 720, the row counter is incremented by one, namely, row=row+1. In step 722, the row counter is compared to the maximum count. If the row count is not greater than the maximum, then the process 700 returns to step 704 to get and evaluate the contents of the next cell in the column from the next row. If the row count is greater than the maximum in step 722, then an adequate representative sample of rows of this column have been evaluated.

Figure 10:
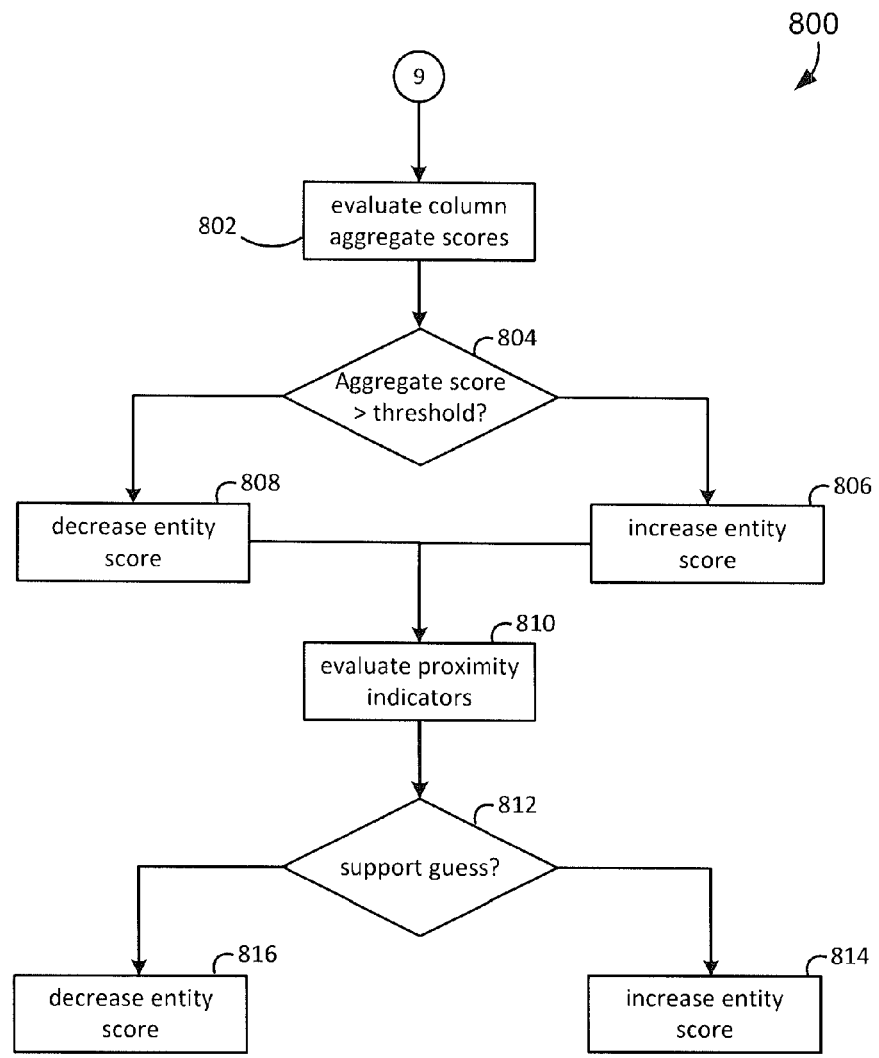
FIG. 10 is a flow chart illustrating score adjustment steps for the process of FIG. 7.

Before going on to the next column, however, additional scoring adjustments may be made for the current column through process 800 shown in FIG. 10. In step 802, an aggregate score for the entire column is evaluated. The scores of all cells in the column for the various entities are combined together in a way that yields both a high recall and a high precision. For example, if the content of the first cell in a column is not recognized as a first name, but the content for 15 of the next 19 cells in the column are recognized as a first name, then the guess that the column is a first_name column is highly plausible. More specifically, the statistical classifier is called multiple times for the same cell contents in order to evaluate the probability for all defined entities. A single aggregated probability is then derived for the entire column.

In step 804, the aggregated score for the column is compared to a defined threshold, for example 80%. If the aggregated score is greater than the threshold, then the confidence score can be increased in step 806. If the aggregated score is less than the threshold, then the confidence score can be decreased in step 808.

In step 810, the proximity of this column relative to other columns is evaluated. Some entities typically occur in a specific order. For example, the column first_name is usually immediately to the left of the column last_name. Likewise, the columns address_line, city, state, zip and country usually occur together, and in that order. Such proximity indicators are well-known for the data model of the database, and can also influence the confidence score. As an example, if a column scores high for first_name, and the column to its immediate right scores high for last_name, this proximity is used to increase the scores of both column mappings even more. Thus, if the proximity indicators support the guess in step 812, then the confidence score can be increased in step 814. If the proximity indicators do not support the guess, then the confidence score can be decreased in step 816.

C. Formulation of the Probabilistic Approximation

In probabilistic terms, the objective is to find a T* that maximizes the posterior probability P(T|S, D) that a given source column S with data D maps to target column T. The calculation of this posterior probability cannot be solved efficiently without introducing approximations or simplifying assumptions. Thus, the first approximation is:

$$P(T|S,D) \approx \Pi_{i=1}^{n} P(T_i | S_i, D_i, f(T_1 \ldots i-1))) \quad (1)$$

In Equation (1), n is the number of source columns. Equation (1) is a reasonable approximation of the posterior probability, in effect saying that the score of a particular target column name for source column i is influenced by (a) the name of the source column, (b) the data of the source column, (c) the name of the target column of to the immediate left of the most likely target column, and (d) a function of the first i-1 target column names in T, explained in more detail below.

Table VIII below shows examples where the target name of the immediate left neighbor helps support a guess as to the target column:

TABLE VIII

| $T_{i-1}$ | most likely $T_i$ |
| --- | --- |
| First name | Last name |
| Address line | City |
| City | State |
| State | Zip |
| Zip | Country |
| Address_line1 | Address_line2 |

A higher-order dependency does not add much value, so the approximation of Equation (1) stops at the first order dependency. However, note that Equation (1) does allow $T_i$ to be influenced by some function of $T_{1 \ldots i-1}$. The term $f(T_{1 \ldots i-1})$ is there in Equation (1) to ensure a low score is assigned to a T in which the same target name appears too often. For example, one would expect the column first_name to appear only once in a source file. If a probabilistic determination of T finds that the entity first_name appears multiple times, it is likely that at least some of these mappings are wrong, and so this solution for T should have a low score. On the other hand, for certain target columns, such as phone and email, a few occurrences may be acceptable since a person may have multiple telephone numbers and/or multiple email addresses. Thus, it is better to model this constraint probabilistically, and not use a hard and fast rule, for example, that no target name can occur multiple times in T.

For simplicity, the term $f(T_{1 \ldots i-1})$ will be ignored in most of the discussion below. As an example, consider the simplified approximation of $P(T_i|T_{i-1}, S_i, D_i)$. Let $S_i$ be "Business City," let $D_i$ contain city names, and let $T_{i-1}$ be the entity address_line. All three of these indicators individually point to and support the conclusion that the target column $T_i$ is the entity city: the source column is named "Business City;" the data of this column is city names; and the column to the immediate left is address_line. Thus, the target column $T_i$ will get a very high score for this $S_i$.

In another example of the simplified approximation of $P(T_i|T_{i-1}, S_i, D_i)$, a heuristic algorithm as described above can be used to evaluate the structure of the data in the cell. Consider the target column $T_i$=email as an example. If the content $D_i$ of the cell contains syntactically well-formed email addresses in most values, then the probability P(email|$T_{i-1}, S_i, D_i$) should be high. Further, if the name of source column $S_i$ is a known alias for the entity email, this supports the guess and the score can be increased. However, if the target column to the immediately left $T_{i-1}$ is a column which expects some other column to follow it—for example, the entityfirst_name expects to be followed by either middle_name or last_name.—this contradicts the guess and the score can be decreased.

For all other entities, we use probabilistic scoring. Specifically:

$$P(T_i|T_{i-1},S_i,D_i) \propto P(T_{i-1},S_i,D_i|T_i)P(T_i) \quad (2)$$

Assuming that $T_{i-1}$, $S_i$, and $D_i$ are all conditionally independent given $T_i$, yields:

$$P(T_{i-1},S_i,D_i|T_i)=P(T_{i-1}|T_i)P(S_i|T_i)P(D_i|T_i) \quad (3)$$

Thus, for any given (S, D), the problem is to find the T that maximizes P(T|S, D). One approach would be to generate and score all plausible T's, but such an effort would be prohibitively slow. Therefore, in one embodiment, a variant of the Viterbi algorithm for a Hidden Markov Model ("HMM") is used. See generally, L. Rabiner, *A Tutorial on Hidden Markov Models and Selected Applications in Speech Recognition* (1989 Proceedings of the IEEE, pp. 257-86; and A. McCallum and D. Freitag, *Maximun Entropy Markov Models for Information Extraction and Segmentation* (2000 Morgan Kaufmann, pp. 591-98).

Let τ denote the set of target column names. Applying the Viterbi algorithm the problem of identifying how to map source columns to defined entities of the data model involves computing Equation (5) for all t∈τ and all i:

$$v_{ti}=\max_{T_1\ldots i-1} P(T_i=t,T_1\ldots_{i-1}|S_1\ldots_i) \quad (5)$$

Equation (5) can be computed efficiently and recursively as:

$$v_{ti}=\max_{t'\in\tau-\{t\}}(v_{t'(i-1)}P(t|t',S_i,D_i)) \quad (6)$$

In Equation (5), $P(t|t', S_i, D_i)$ is computed via Equations (2) and (3) for most t's, and via heuristic analysis for other t's, as discussed earlier. For convenience, a new 'target column name' b can be added denoting the BEGIN state in the corresponding probability model. The initial conditions are then $v_{b0}=1$ and $v_{t0}=0$ for all t∈τ.

Computing the entire matrix v using Equation (6) is a time consuming effort, impacting real-time mapping. Therefore, to make this algorithm more efficient, the following preprocessing step is added:

$$T_c(i)=\{t|P(t|S_i,D_i)\geq\delta\} \quad (7)$$

where δ>0 is a defined parameter. For the t's that are scored probabilistically, $P(t|S_i, D_i)$ is computed through versions of Equations (2) and (3) with setting P(t) as the uniform prior 1/|τ|, and in which the term $P(T_{i-1}|T_i)$ is dropped. That is:

$$P(t|S_i,D_i) \propto P(S_i|T_i)P(D_i|T_i)$$

For the rest of the t's, $P(t|S_i, D_i)$, is computed via heuristic analysis.

$T_c(i)$ is the subset of T that can be a plausible mapping for source column i. In most cases, one would expect $|T_c(i)|<<|\tau|$. This may be leveraged in two ways to improve the speed of the processing steps. First, $v_{ti}$ is computed only for t∈$T_c$ rather than for all t∈τ. Second, $v_{ti}$ may be computed more efficiently by replacing t'∈τ-{t} in (6) by t'∈$T_c$(i-1)-{t}.

C. Training Sets

For entities that are scored probabilistically, two types of training sets are generally available for the estimation of the probability distributions in Equations (2) and (3), namely (i) a training set of (entity_name, entity_value) pairs, and (ii) a training set of (source header row, target header row) pairs.

The probability distributions for $P(S_i|T_i)$, $P(T_i)$, and $P(T_{i-1}|T_i)$ will be estimated from the type ii training set. The probability distributions for $P(D_i|T_i)$ distributions will be estimated from the type i training set. Specifically, the statistical classifier will be trained on a type i data set, and it will return the likelihood $P(e|T_i)$ when given an entity value e and target entity $T_i$ as input. As mentioned above, the probability is scored on content in the first twenty rows or so of column i, namely:

$$P(D_i|T_i) \propto \Pi_{j=1}^{20} P(d_{ij}|T_i) \quad (4)$$

where $d_{ij}$ denotes the jth value in $D_i$. Please also note the entity values are conditionally independent given the entity name.

Both types of training sets are split because the type i training sets are concerned only with entity names and entity values. Very large training sets of this type can often be assembled with virtually no human effort. For example, type i training sets having more than 100 million such pairs may be easily and programmatically constructed from contact databases and company databases.

A type ii training set will typically be constructed manually since it involves examining a large number of source files for a particular object, e.g., a contact, and manually mapping the source row to a target row. One example of such a training set for contacts is shown in Table IX below.

TABLE IX

| Source Header Row | Target Header Row |
|---|---|
| First | first_name |
| Last | last_name |
| Job Title | title |
| Account Name | company |
| Business email | email |
| Fax # | fax |

It is also convenient to be able to specify (source column name, target column name) pairs directly. Although such pairs do not have the proximity information that can be gleaned from multiple columns, a large and diverse set of (alias, target column name) pairs can be quickly assembled. One example is shown in Table X below.

TABLE X

| Source Column Name | Target Column Name |
|---|---|
| First | first_name |
| job position | title |
| business email | email |
| title | title |
| title | salutation |
| postal code | zip |
| account name | company |
| business city | city |
| firm name | company |
| Telephone | phone |
| street address | address |
| organization | company |
| division | department |

$P(S_i|T_i)$ will be learned from a type ii training set, which means that the common aliases for standard (target) column names can be learned from the training set, but there can also be a probabilistic component, which is useful in ambiguous cases. For example, the source column "title" could possibly mean the target column (job) title or the target column salutation, and thus, P(title|job title) and P(title|salutation) will both be greater than zero. This ambiguity may be resolved, in a particular case, by looking probabilistically at the content of this column in addition to $P(S_i|T_i)$. Pseudo-counts may be used to ensure that $P(S_i|T_i)$ is always greater than 0 in order to avoid an unknown source column name (e.g., gibberish) forcing $P(S_i|T_i)$ to 0 for every $T_i$, thus making it impossible to find any target column name for that $S_i$.

It should be evident that the richer the training set, the more accurate the column mapper is likely to be. Consider a type ii training set. There are typically many source files available to model. The hard part of training set construction is labeling the source rows, i.e., constructing the target rows to be paired with the source rows. This process can be made more efficient by first training a bootstrap version of the column mapper on a simple (type i plus type ii) training set, using this column mapper to label a source row in a source file with a target row, and manually correcting any labeling errors. If the accuracy is high, then the time taken to manually correct the labeling errors is significantly lower than the time it takes to label all the sources from scratch.

6. Detailed System Description

FIG. 2A is a block diagram of an exemplary environment 110 for use of an on-demand database service. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may not have all of the components listed and/or may have other elements instead of, or in addition to, those listed above.

User system 112 may be any machine or system used to access a database user system. For example, any of the user systems 112 could be a handheld computing device, a mobile phone, a laptop computer, a work station, and/or a network of computing devices. As illustrated in FIG. 2A (and in more detail in FIG. 2B), user systems 112 might interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services may store information from one or more tenants into tables of a common database image to form a multi-tenant database system (MTS). Accordingly, the terms "on-demand database service 116" and "system 116" will be used interchangeably in this disclosure. A database image may include one or more database objects or entities. A database management system (DBMS) or the equivalent may execute storage and retrieval of information against the database objects or entities, whether the database is relational or graph-oriented. Application platform 118 may be a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permission levels for the current user. For example, where a salesperson is using a particular user system 112 to interact with system 116, that user system has the capacities allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global network of networks often referred to as the Internet, that network will be used in many of the examples herein. However, it should be understood that the networks that the one or more implementations might use are not so limited, although TCP/IP is a frequently implemented protocol.

User systems 112 might communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a browser for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the data stored in the MTS; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 2A, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 2A include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 2B also illustrates environment 110. However, in FIG. 2B elements of system 116 and various interconnections in an embodiment are further illustrated. FIG. 2B shows that user system 112 may include processor system 112A, memory system 112B, input system 112C, and output system 112D. FIG. 2B shows network 114 and system 116. FIG. 2B also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 2A. Regarding user system 112, processor system 112A may be any combination of one or more processors. Memory system 112B may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 2B, system 116 may include a network interface 115 (of FIG. 2A) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases, or in distributed memory as described herein.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in commonly owned, co-pending U.S. Provisional Patent App. No. 60/828,192, entitled Programming Language Method And System For Extending APIs To Execute In Conjunction With Database APIs, filed Oct. 4, 2006, which is incorporated in its entirety herein for all purposes. Invocations to applications may be detected by one or more system processes, which manages retrieving application metadata 216 for the subscriber making the invocation and executing the metadata as an application in a virtual machine.

Each application server 200 may be coupled for communications with database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, an interface system implementing a load balancing function (e.g., an F5 Big-IP IP load balancer) is coupled for communication between the application servers 200 and the user systems 112 to distribute requests to the application servers 200. In one embodiment, the load balancer uses a "least connections" algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant and handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be shared organization-wide or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for mapping a first plurality of source columns from a source file to a target file, each column of the source file having a header and a plurality of cells, each cell containing content, the target file having a second plurality of target columns, at least some of the target columns modeled to represent a third plurality of predefined entities, comprising, for each source column:
    evaluating heuristically whether the header for the source column matches at least one of the predefined entities, and if so, creating an initial mapping of the correspondence between the source column and the predefined entities;
    evaluating probabilistically, in response to a determination that the header for the source column does not match at least one of the predefined entities, whether the cell contents of the source column correspond to at least one of the predefined entities, and if so, creating an initial mapping of the correspondence between the source column and the predefined entities;
    assigning an entity score to the likelihood that the source column corresponds to the predefined entities in the initial mapping;
    evaluating at least one proximity indicator for the source column, wherein if the proximity indicator supports the initial mapping, then the entity score is increased, and wherein if the proximity indicator does not support the initial mapping, then the entity score is decreased;
    comparing the entity score for each predefined entity to a threshold, wherein if the threshold is met or exceeded, then creating a final mapping of the correspondence between the source column and the predefined entities, and wherein if the threshold is not met, then creating a final mapping of the correspondence between the source column and undefined entities; and
    transforming each source column to a target column in accord with the final mapping.

2. The method of claim 1, the heuristic evaluation step further comprising:
    determining whether a format of the header for the source column matches a format of at least one of the predefined entities, and if so, creating the initial mapping of the correspondence between the source column and the predefined entities.

3. The method of claim 1, the heuristic evaluation step further comprising:
    determining whether a name of the header matches a known alias of at least one of the predefined entities, and if so, creating an initial mapping of the correspondence between the column and the predefined entities.

4. The method of claim 1, the probabilistic evaluation step further comprising:
    evaluating the contents of a subset of the plurality of cells in the source column;
    for each cell in the subset, assigning a cell score to the likelihood that the contents of the cell indicate that the column corresponds with at least one of the predefined entities; and
    aggregating the cell scores of all cells in the subset, wherein if the aggregated cell scores exceeds a cell score threshold, then the entity score is increased, and wherein if the aggregated cell scores does not exceed the cell score threshold, then the entity score is decreased.

5. The method of claim 1, wherein the proximity indicator evaluates the initial mapping in the context of the names of adjacent target columns, wherein if the name of an adjacent target column supports the initial mapping, then the entity score is increased, and wherein if the name of an adjacent target column does not support the initial mapping, then the entity score is decreased.

6. The method of claim 1, the transforming step further comprising performing post-processing on source columns that correspond to undefined entities.

7. The method of claim 6, wherein selected source columns corresponding to undefined entities are ignored in the transforming step.

8. The method of claim 6, wherein selected source columns corresponding to undefined entities are merged in the transforming step, and the merged columns are mapped to one of the predefined entities.

9. The method of claim 6, wherein selected source columns corresponding to undefined entities are split in the transforming step, and the split columns are mapped to two of the predefined entities.

10. The method of claim 1, wherein the initial mappings are assigned a weight, and the weight is factored into the entity score.

11. The method of claim 10, wherein the initial mapping created from the heuristic evaluation generates a high weight value.

12. The method of claim 10, wherein the initial mapping created from the probabilistic evaluation generates a modest weight value.

13. A non-transitory computer-readable medium encoded with instruction for mapping a first plurality of source columns from a source file to a target file, each column of the source file having a header and a plurality of cells, each cell containing content, the target file having a second plurality of target columns, at least some of the target columns modeled to represent a third plurality of predefined entities, the instructions comprising:

evaluating heuristically whether the header for the source column matches at least one of the predefined entities, and if so, creating an initial mapping of the correspondence between the source column and the predefined entities;

evaluating probabilistically, in response to a determination that the header for the source column does not match at least one of the predefined entities, whether the cell contents of the source column correspond to at least one of the predefined entities, and if so, creating an initial mapping of the correspondence between the source column and the predefined entities;

assigning an entity score to the likelihood that the source column corresponds to the predefined entities in the initial mapping;

evaluating at least one proximity indicator for the source column, wherein if the proximity indicator supports the initial mapping, then the entity score is increased, and wherein if the proximity indicator does not support the initial mapping, then the entity score is decreased;

comparing the entity score for each predefined entity to a threshold, wherein if the threshold is met or exceeded, then creating a final mapping of the correspondence between the source column and the predefined entities, and wherein if the threshold is not met, then creating a final mapping of the correspondence between the source column and undefined entities; and transforming each source column to a target column in accord with the final mapping.

14. The computer-readable medium of claim 13, the heuristic evaluation step further comprising:

determining whether a format of the header for the source column matches a format of at least one of the predefined entities, and if so, creating the initial mapping of the correspondence between the source column and the predefined entities.

15. The computer-readable medium of claim 13, the heuristic evaluation step further comprising:

determining whether a name of the header matches a known alias of at least one of the predefined entities, and if so, creating an initial mapping of the correspondence between the column and the predefined entities.

16. The computer-readable medium of claim 13, the probabilistic evaluation step further comprising:

evaluating the contents of a subset of the plurality of cells in the source column;

for each cell in the subset, assigning a cell score to the likelihood that the contents of the cell indicate that the column corresponds with at least one of the predefined entities; and aggregating the cell scores of all cells in the subset, wherein if the aggregated cell scores exceeds a cell score threshold, then the entity score is increased, and wherein if the aggregated cell scores does not exceed the cell score threshold, then the entity score is decreased.

17. The computer-readable medium of claim 13, wherein the proximity indicator evaluates the initial mapping in the context of the names of adjacent target columns, wherein if the name of an adjacent target column supports the initial mapping, then the entity score is increased, and wherein if the name of an adjacent target column does not support the initial mapping, then the entity score is decreased.

18. The computer-readable medium of claim 13, the transforming step further comprising performing post-processing on source columns that correspond to undefined entities.

19. The computer-readable medium of claim 18, wherein selected source columns corresponding to undefined entities are ignored in the transforming step.

20. The computer-readable medium of claim 18, wherein selected source columns corresponding to undefined entities are merged in the transforming step, and the merged columns are mapped to one of the predefined entities.

21. The computer-readable medium of claim 18, wherein selected source columns corresponding to undefined entities are split in the transforming step, and the split columns are mapped to two of the predefined entities.

22. The computer-readable medium of claim 13, wherein the initial mappings are assigned a weight, and the weight is factored into the entity score.

23. The computer-readable medium of claim 22, wherein the initial mapping created from the heuristic evaluation generates a high weight value.

24. The computer-readable medium of claim 22, wherein the initial mapping created from the probabilistic evaluation generates a modest weight value.

25. A method for mapping columns from a source file to a target file, the target file having at least some target columns modeled to represent predefined entities, comprising:

receiving a source file having a plurality of source columns, each source column having a header and a plurality of cells arranged in rows of the column, each cell containing content;

evaluating whether the header for each source column matches at least one of the predefined entities, and if so, creating an initial mapping of the correspondence between each source column and the predefined entities;

evaluating, in response to a determination that the header for each source column does not match at least one of the predefined entities, whether the contents of at last some cells for each source column corresponds to at least one of the predefined entities, and if so, creating an initial mapping of the correspondence between each source column and the predefined entities;

scoring the likelihood that each source column corresponds to one of the predefined entities in the initial mapping;

evaluating at least one proximity indicator for each source column, wherein if a corresponding proximity indicator supports the initial mapping, then the corresponding entity score is increased, and wherein if the corresponding proximity indicator does not support the initial mapping, then the corresponding entity score is decreased;

creating a final mapping of the correspondence between each source column and the predefined entities based on the scoring step; and transforming each source column to a target column in accord with the final mapping.

26. An apparatus for mapping columns from a source file to a target file, the target file having at least some target columns modeled to represent predefined entities, comprising:

a processor; and one or more stored sequences of instructions which, when executed by the processor, cause the processor to carry out the steps of:

receiving a source file having a plurality of source columns, each source column having a header and a plurality of cells arranged in rows of the column, each cell containing content;

evaluating the header of each source column using a heuristic process to determine whether the header for the source column matches at least one of predefined entities, and, if so, create an initial mapping of the correspondence between each source column and the predefined entities' evaluating, in response to a determination that the header for each source column does not match at least one of the predefined entities, the header of each source column and the content of selected cells of each column using a probabilistic process to create an initial mapping of the correspondence between each source column and the predefined entities' evaluating at least one proximity indicator for each source column, wherein if a corresponding proximity indicator supports the initial mapping, then a corresponding likelihood is increased, and wherein if the corresponding proximity indicator does not support the initial mapping, then the corresponding likelihood is decreased;

creating a final mapping of the correspondence between each source column and the predefined entities based on scoring the likelihood of the initial mappings; and transforming each source column to a target column in accord with the final mapping.

\* \* \* \* \*